A. I. HOVLAND.
SPROCKET DRIVE CHAIN.
APPLICATION FILED JUNE 16, 1913.

1,193,550.

Patented Aug. 8, 1916.
2 SHEETS—SHEET 1.

WITNESSES
M. R. McInnis
E. A. Paul

INVENTOR
ANTON I. HOVLAND
BY
Paul & Paul
ATTORNEYS

A. I. HOVLAND.
SPROCKET DRIVE CHAIN.
APPLICATION FILED JUNE 16, 1913.

1,193,550.

Patented Aug. 8, 1916.
2 SHEETS—SHEET 2.

WITNESSES
M. R. McInnis
E. A. Paul

INVENTOR
ANTON I. HOVLAND
BY Paul & Paul
ATTORNEYS

UNITED STATES PATENT OFFICE.

ANTON I. HOVLAND, OF MARSHALL, MINNESOTA.

SPROCKET DRIVE-CHAIN.

1,193,550.

Specification of Letters Patent. Patented Aug. 8, 1916.

Application filed June 16, 1913. Serial No. 773,982.

*To all whom it may concern:*

Be it known that I, ANTON I. HOVLAND, citizen of the United States, resident of Marshall, county of Lyon, State of Minnesota, have invented certain new and useful Improvements in Sprocket Drive-Chains, of which the following is a specification.

The object of my invention is to provide means for taking up the slack in a chain due to the wear of the pivotal connections between the links.

A further object is to provide means for changing the pitch line of the sprocket with respect to the drive chain.

To this end my invention consists generally in various constructions and combinations, all as hereinafter described and particularly pointed out in the claims.

Figure 1:
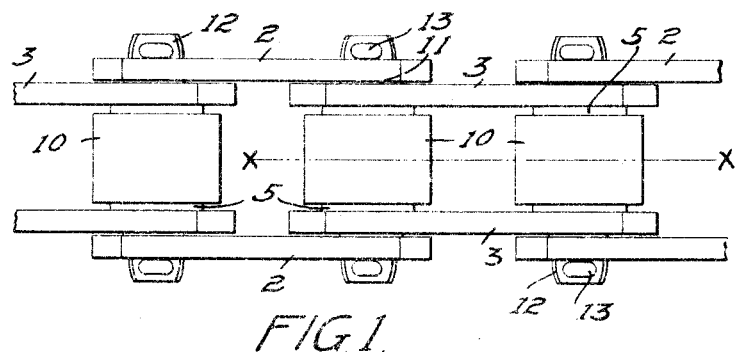
Figure 2:
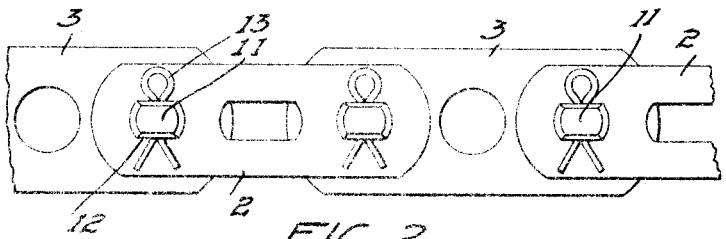
Figure 3:
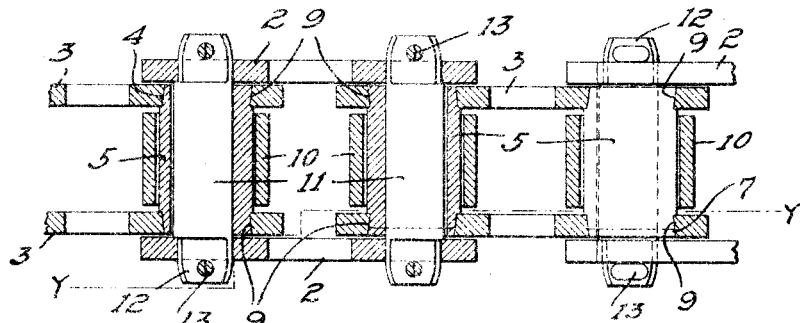
Figure 4:
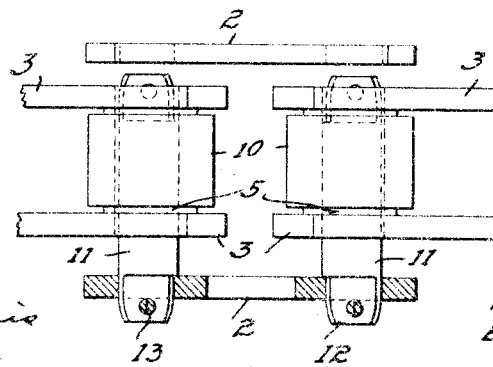
Figure 6:
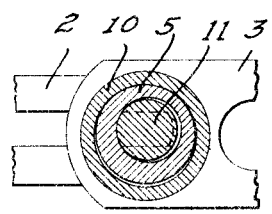
Figure 5:
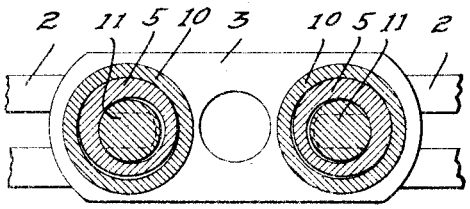
Figure 7:
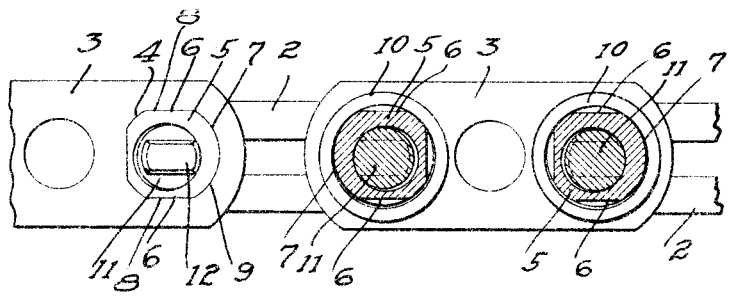
Figures 8, 9:
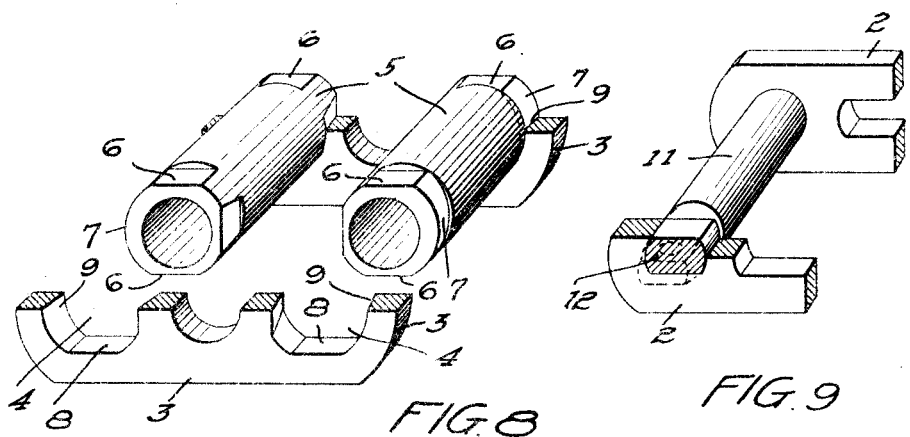

In the accompanying drawings forming part of this specification, Figure 1 is a plan view of a portion of a sprocket chain with my invention applied thereto, Fig. 2 is a side view of the same, Fig. 3 is a sectional view through the chain, Fig. 4 is a detail sectional view, showing the pins reversed to shorten the chain, Fig. 5 is a sectional view on the line $x$—$x$ of Fig. 1, Fig. 6 is a similar view, showing bushing reversed when sprocket is worn, Fig. 7 is a sectional view on the line $y$—$y$ of Fig. 3, Fig. 8 is a perspective view, illustrating the means for taking up the wear of the links on the sprocket wheels, Fig. 9 is a perspective view, showing the pivotal connection between the links.

In the drawings, 2 and 3 represent the side bars of the links, the links 2 on each side of the chain being arranged to lap over the adjacent ends of the bars 3. The links 3 have sockets 4 therein adapted to receive the ends of the bushings 5. These ends are provided with flat surfaces 6 and with surfaces 7 which are tapered slightly, the surfaces 6 fitting upon corresponding flat surfaces 8 in the bars 3 and the tapered surfaces 7 fitting corresponding surfaces 9. The taper of these surfaces has the effect of drawing the bars 3 inwardly or together when strain is applied to the chain. The bushings 5 may be turned end for end in the links for the purpose of raising or lowering the axis of the bore of the bushings to compensate for wear of the sprocket teeth. This is illustrated in Figs. 5 and 6, in which the different positions of the bushings are shown. In Fig. 6 the bushing is reversed from its position in Fig. 5 to raise the links. This changing of the pitch line is important in a device of this kind where it is impracticable to reverse the belt when it becomes worn.

Loosely mounted on the bushings 5 are anti-friction rollers 10. These rollers have a slight endwise movement and are adapted to bear on the teeth of the sprocket wheels. As before stated, the bars 2 lap over the bars 3 and for the purpose of connecting these bars with one another I provide pivots consisting of pins 11 having flattened end portions 12 which pass through correspondingly shaped openings in the bars 2 and through the bushing 5, said end portions being eccentrically arranged with respect to the middle portions of the pins and having holes in their outer ends to receive cotter pins 13 which serve to secure the bars of the chain links together. These pins may be removed from the link bars and reversed and owing to the eccentric arrangement of their bearings in the bars of one link with respect to the bars of the other link, any lost motion resulting from wear of the bars may be taken up.

To separate the links, the cotter pins are removed, as indicated in Fig. 4, whereupon the pins 11 can be pulled out and turned over and the bushings may also be separated from the bars 3 and reversed, and wear or any looseness or lost motion in the chain quickly eliminated.

I claim as my invention:—

1. A sprocket chain having links composed of side bars, the bars of one link lapping over the adjacent bars of the adjoining link, bushings mounted in the inner bars of said links and having eccentric openings therein, and pins having eccentric surfaces fitting within said openings and seated in the outer bars of said links, said bushings and pins being capable of being turned end for end, for the purpose specified.

2. A sprocket chain comprising links composed of side bars, bushings having end portions fitting within the side bars of some of said links, said bushings having flat and tapered surfaces at their ends seated against corresponding surfaces in said bars, whereby strain on said bars will draw them inwardly on said bushings, and pivot pins passing through said bushings and having bearings in the bars of said other links.

3. A sprocket chain comprising links having side bars, pivot pins for said links, and bushings having eccentrically arranged openings therein to receive said pins, said bushings being adapted to be turned end for end to raise or lower the links.

In witness whereof, I have hereunto set my hand this 6th day of June, 1913.

ANTON I. HOVLAND.

Witnesses:
EDWARD A. PAUL,
GENEVIEVE E. SORENSEN.